UNITED STATES PATENT OFFICE.

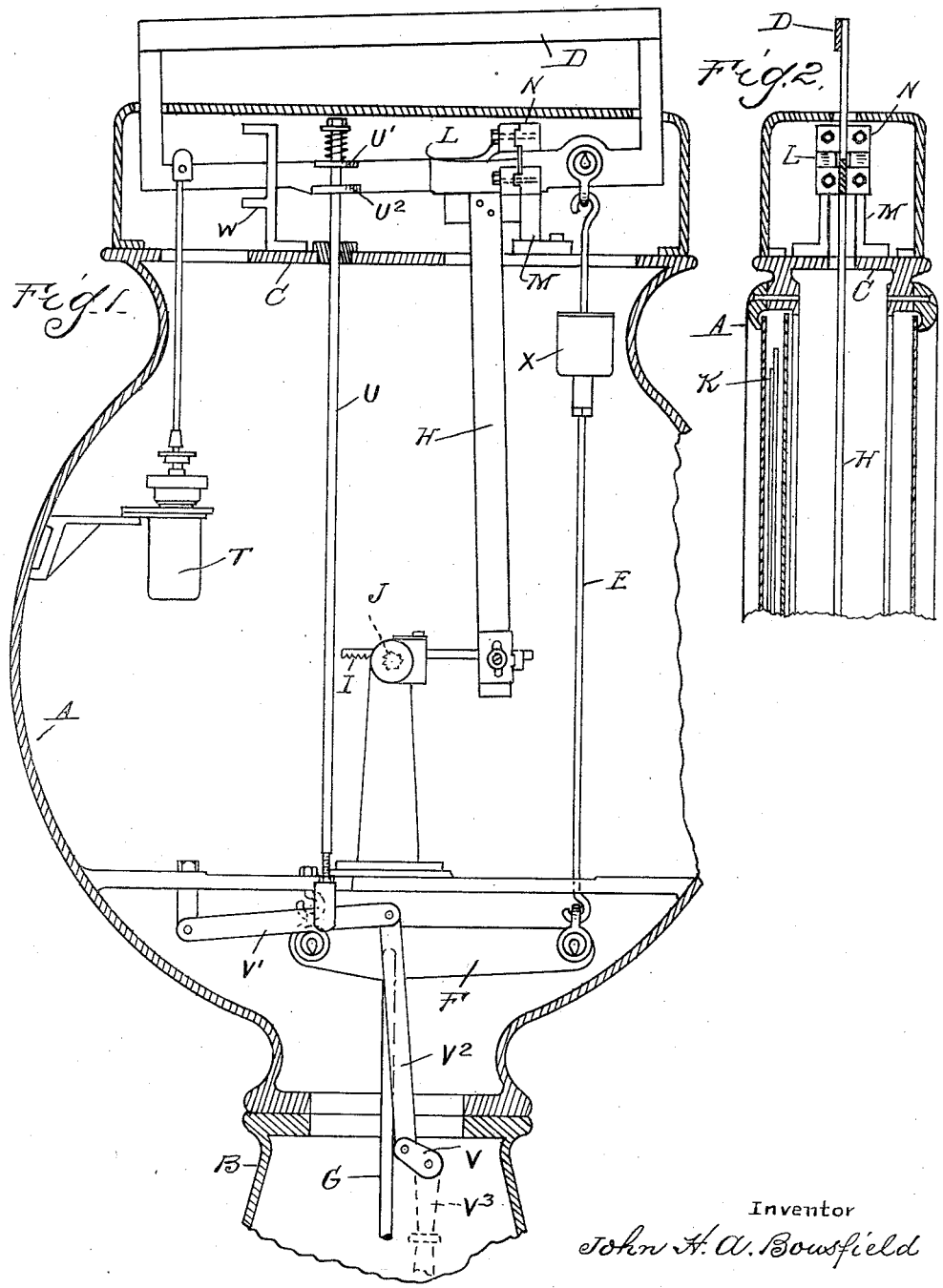

JOHN H. A. BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT.

SCALE.

1,279,835.

Specification of Letters Patent.

Patented Sept. 24, 1918.

Application filed February 28, 1917. Serial No. 151,585.

*To all whom it may concern:*

Be it known that I, JOHN H. A. BOUSFIELD, a citizen of the United States of America, residing at St. Johnsbury, in the county of Caledonia and State of Vermont, have invented certain new and useful Improvements in Scales, of which the following is a specification, reference being had therein to the accompanying drawings.

The invention relates to scales of the automatic type, in which a variable resistance is employed to balance the load, the deflection being measured on a dial or other indicator which is calibrated to indicate the weight of the load. Various constructions have heretofore been employed for the variable resistance, such as coil-springs, pendulum-weights, etc. I have greatly simplified the construction by substituting for such devices a resilient flexure plate, which also forms a fulcrum or pivot for a moving part of the mechanism. Preferably this flexure plate is arranged to form the fulcrum for the beam of the scale, but it may be applied to any other parts of the mechanism.

In the drawings:

Figure 1 is a sectional elevation of a dial-scale to which my invention is applied, the dial being removed;

Fig. 2 is a section at right angles to Fig. 1;

Figure 3:
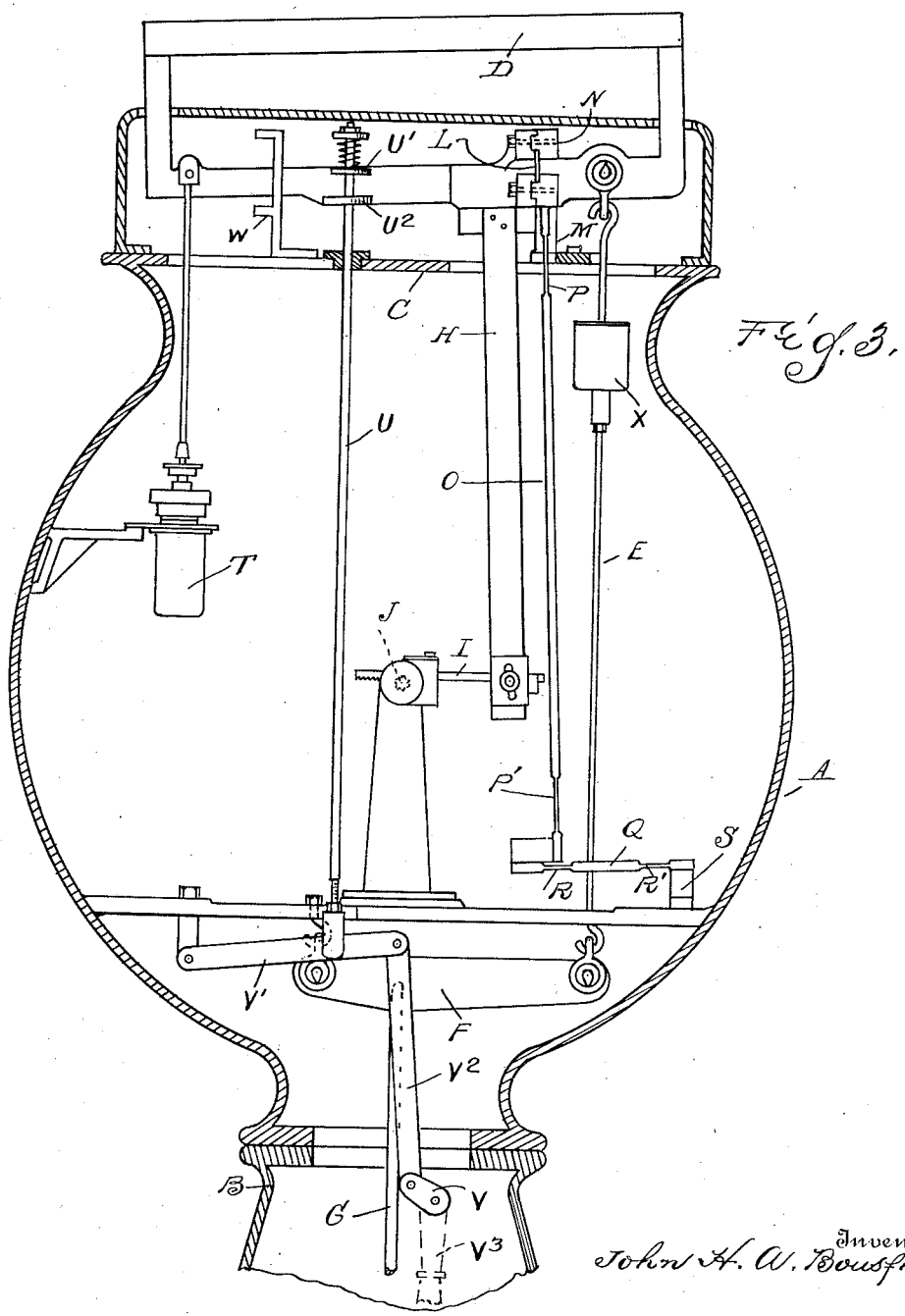
Fig. 3 is a view similar to Fig. 1 showing a modified construction.

With the construction shown, A is the dial casing, which is mounted upon a suitable pedestal B and provided at its upper end with a shelf C, above which is arranged the beam D. This beam is connected by the steelyard E, lever F and rod G to the platform levers (not shown). H is an arm depending from the beam D, which is connected to a rack-bar I engaging a pinion J for rotating the dial K.

As heretofore constructed the scale mechanism is provided with a variable resistance, such as a pendulum-weight depending from the beam, or springs arranged to variably resist the movement of the steelyard. These devices I have dispensed with and, as above stated, have substituted a resilient flexure plate. As shown in Fig. 1, L is a flexure plate arranged to form the fulcrum for the beam D. The lower end of the plate is clamped to a fulcrum-bracket M mounted upon the shelf C, while the upper end of the plate is secured between clamping lugs N on the beam. The variable resistance is determined both by the gage or thickness of the plate and by the length between the clamping bearings, so that by suitable adjustment any desired resistance may be obtained.

In the construction shown in Fig. 3, O is a bar connected at its upper end to the beam and depending therefrom, said bar being provided with thinned flexible and resilient portions P and P' near its upper and lower end. The lower end of the bar O is attached to a laterally-extending bar Q having thinned flexible and resilient portions R and R', the outer end of the bar being rigidly attached at S to the frame. With this construction the variable resistance is produced by the flexing of the several thin portions of the bars O and Q, such flexing being necessary to permit the tilting of the beam upon its fulcrum.

It is obvious that the same principle of construction may be applied in various ways, all of which come within the spirit of my invention.

In the present construction, T is a dash-pot connected to the beam D for preventing too rapid oscillation thereof; U is a rod extending through the casing A and shelf C and having a collar U' adapted to bear upon the lug U² upon the beam D when the rod U is drawn downward. The lower end of the rod U is attached to a crank V by means of the lever V' and link V², and a handle V³ secured to the crank may be operated to rock the lever to draw the rod U downward to lock the beam against the stop W mounted upon the shelf C to hold the beam from oscillation. X is a balancing cup or counterpoise for the beam D and is mounted upon the steelyard E. The arrangement of the above parts may be varied in a number of ways and forms no part of my present invention.

What I claim as my invention is:—

In a scale, the combination with an oscillatory beam, an indicator, indicator operating connections between said beam and indicator, and connections between said beam and weighing platform, of a stationary member, and a transversely extending flexure plate arranged on edge and having its opposite edges rigidly clamped to said oscillatory beam and stationary member, said plate constituting a fixed fulcrum for said oscillatory beam and having a predetermined resilient resistance to the movement of said oscillatory part to constitute the sole weighing resistance.

In testimony whereof I affix my signature in presence of two witnesses.

JOHN H. A. BOUSFIELD.

Witnesses:
 HORACE E. ANDERSON,
 OSMAR A. ULLRICH.